(12) United States Patent
Rans et al.

(10) Patent No.: US 10,817,878 B2
(45) Date of Patent: Oct. 27, 2020

(54) SYSTEMS AND METHODS FOR VERIFYING USERS, IN CONNECTION WITH TRANSACTIONS USING PAYMENT DEVICES

(71) Applicant: MASTERCARD INTERNATIONAL INCORPORATED, Purchase, NY (US)

(72) Inventors: Jean-Paul Edmond Rans, Glabais (BE); Sumeet Bhatt, Jericho, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 197 days.

(21) Appl. No.: 15/178,061

(22) Filed: Jun. 9, 2016

(65) Prior Publication Data
US 2016/0364730 A1 Dec. 15, 2016

Related U.S. Application Data

(63) Continuation-in-part of application No. 15/061,077, filed on Mar. 4, 2016, now abandoned.
(Continued)

(51) Int. Cl.
*G06Q 20/40* (2012.01)
*G06Q 20/34* (2012.01)
*G06Q 20/38* (2012.01)

(52) U.S. Cl.
CPC ..... *G06Q 20/40145* (2013.01); *G06Q 20/341* (2013.01); *G06Q 20/3563* (2013.01); *G06Q 20/3574* (2013.01); *G06Q 20/38215* (2013.01)

(58) Field of Classification Search
CPC ........... G06Q 20/341; G06Q 20/38215; G06Q 20/40145; G06Q 20/3563; G06Q 20/3574
(Continued)

(56) References Cited

U.S. PATENT DOCUMENTS

| 4,582,985 A | 4/1986 | Lofberg |
| 5,623,552 A * | 4/1997 | Lane ............... G06K 13/073 |
| | | 382/124 |

(Continued)

FOREIGN PATENT DOCUMENTS

| JP | 11-025246 | 1/1999 |
| JP | 2000-250861 | 9/2000 |

(Continued)

OTHER PUBLICATIONS

Ron White, How Computers Work, Oct. 15, 2003, Paul Boger, Illustrated by Timothy Edward Downs, 7th Edition (Year: 2003).*
(Continued)

*Primary Examiner* — Mohammad A. Nilforoush
*Assistant Examiner* — Wodajo Getachew
(74) *Attorney, Agent, or Firm* — Harness, Dickey & Pierce, P.L.C.

(57) ABSTRACT

Systems and methods for verifying users in connection with transactions using payment devices are disclosed. One exemplary method generally includes receiving a select command for an AID associated with a payment application from a terminal and, in response, initiating by a security chip of a payment device, a timer after power-up of the security chip by the terminal. The method also includes capturing a biometric of a user, at a biometric sensor, according to the payment application, and verifying, by the security chip, the captured biometric based on reference biometric data. The method further includes, when the timer is unexpired and the captured biometric is verified, appending a first value to a CVR and returning a first AFL to the terminal, and when the timer is expired, appending a different value to the CVR and returning a different AFL to the terminal.

11 Claims, 5 Drawing Sheets

Related U.S. Application Data

(60) Provisional application No. 62/173,144, filed on Jun. 9, 2015.

(58) Field of Classification Search
USPC .......................................................... 705/67
See application file for complete search history.

(56) References Cited

U.S. PATENT DOCUMENTS

| | | | |
|---|---|---|---|
| 5,712,473 A | 1/1998 | Nagashio | |
| 5,748,737 A * | 5/1998 | Daggar | G06K 7/0021 235/379 |
| 5,801,367 A | 9/1998 | Asplund et al. | |
| 6,208,264 B1 | 3/2001 | Bradney et al. | |
| 6,213,403 B1 | 4/2001 | Bates, III | |
| 6,325,285 B1 | 12/2001 | Baratelli | |
| 6,360,953 B1 | 3/2002 | Lin et al. | |
| 6,494,380 B2 | 12/2002 | Jarosz | |
| 6,547,130 B1 | 4/2003 | Shen | |
| 6,592,031 B1 | 7/2003 | Klatt | |
| 6,624,739 B1 | 9/2003 | Stobbe | |
| 6,826,537 B1 | 11/2004 | Wood et al. | |
| H2120 H * | 7/2005 | Cudlitz | G06K 19/07749 235/382 |
| 6,954,133 B2 * | 10/2005 | McGregor | G05B 19/0425 235/375 |
| 7,028,893 B2 | 4/2006 | Goodman et al. | |
| 7,044,368 B1 * | 5/2006 | Barron | G06K 19/07 235/380 |
| 7,155,416 B2 | 12/2006 | Shatford | |
| 7,997,477 B2 | 8/2011 | Robinson | |
| 8,103,528 B2 | 1/2012 | Read et al. | |
| 9,813,236 B2 | 11/2017 | Buer | |
| 2001/0008004 A1 * | 7/2001 | Jarosz | G06K 9/0002 711/1 |
| 2002/0180584 A1 * | 12/2002 | McGregor | G07C 9/257 340/5.26 |
| 2004/0204951 A1 | 10/2004 | Wood et al. | |
| 2005/0137977 A1 | 6/2005 | Wankmueller | |
| 2006/0000892 A1 * | 1/2006 | Bonalle | G06Q 20/341 235/380 |
| 2006/0064380 A1 | 3/2006 | Zukerman | |
| 2006/0095369 A1 * | 5/2006 | Hofi | G06Q 20/10 705/39 |
| 2006/0107067 A1 * | 5/2006 | Safal | G06K 9/00885 713/186 |
| 2007/0073619 A1 * | 3/2007 | Smith | G06Q 20/105 705/41 |
| 2007/0101413 A1 | 5/2007 | Vishik et al. | |
| 2008/0091576 A1 | 4/2008 | Teelock et al. | |
| 2008/0217398 A1 * | 9/2008 | Woo | G06K 19/08 235/380 |
| 2008/0222720 A1 | 9/2008 | Sines | |
| 2009/0076966 A1 | 3/2009 | Bishop et al. | |
| 2009/0084858 A1 * | 4/2009 | Borracci | G06K 19/0718 235/492 |
| 2009/0143104 A1 | 6/2009 | Loh et al. | |
| 2009/0204441 A1 | 8/2009 | Read et al. | |
| 2010/0153722 A1 | 6/2010 | Bauchot et al. | |
| 2012/0218074 A1 | 8/2012 | Luckhardt | |
| 2012/0228375 A1 * | 9/2012 | Iwaloye | G07F 7/0813 235/379 |
| 2012/0233074 A1 | 9/2012 | Dangott et al. | |
| 2012/0330765 A1 | 12/2012 | Fried et al. | |
| 2013/0159194 A1 | 6/2013 | Habib | |
| 2013/0307670 A1 | 11/2013 | Ramaci | |
| 2014/0025583 A1 | 1/2014 | McNeal | |
| 2014/0046838 A1 | 2/2014 | Dogin et al. | |
| 2014/0239065 A1 * | 8/2014 | Zhou | G06F 1/163 235/380 |
| 2014/0339315 A1 | 11/2014 | Ko | |
| 2015/0170112 A1 * | 6/2015 | DeCastro | G06Q 20/381 705/39 |
| 2015/0310440 A1 | 10/2015 | Hynes et al. | |
| 2016/0364703 A1 | 12/2016 | Bhatt et al. | |
| 2016/0364730 A1 * | 12/2016 | Rans | G06Q 20/40145 |

FOREIGN PATENT DOCUMENTS

| | | |
|---|---|---|
| JP | 2003-208553 | 7/2003 |
| JP | 2006-119811 | 5/2006 |
| JP | 2006-172158 | 6/2006 |
| JP | 5713516 B | 3/2015 |
| KR | 10-2012-0009931 | 2/2012 |

OTHER PUBLICATIONS

EMVCO: "EMV2000 Integrated Circuit Card Specification for Payment Systems, Book 3—Application Specification", Internet Citation, Dec. 2000, XP02319756, Retrieved from the internet (Mar. 2, 2005): http://www.emvco.com/specifications.cfm; 164 pgs.

* cited by examiner

SYSTEMS AND METHODS FOR VERIFYING USERS, IN CONNECTION WITH TRANSACTIONS USING PAYMENT DEVICES

CROSS-REFERENCE TO RELATED APPLICATIONS

This application is a continuation-in-part of U.S. patent application Ser. No. 15/061,077 filed Mar. 4, 2016, which claims the benefit of, and priority to, U.S. Provisional Application No. 62/173,144 filed on Jun. 9, 2015. The entire disclosures of the above applications are incorporated herein by reference.

FIELD

The present disclosure generally relates to systems and methods for verifying users based on biometrics, in connection with transactions using payment devices, prior to, for example, authorizing the transactions, distributing benefits associated with the transactions to the users (e.g., products, payments, etc.), etc.

BACKGROUND

This section provides background information related to the present disclosure which is not necessarily prior art.

Payment account cards are often used by individuals in financial transactions such as, for example, the purchase of goods and/or services (broadly, products) from merchants, etc. The same payment account cards, or different payment account cards (e.g., ATM cards, etc.), may also be used to access funds and/or to transfer funds from sources into or out of payment accounts associated with the cards. Further, benefits such as social assistance, etc. are known to be provided to the payment accounts, and accessed via the payment account cards. Separately, a variety of card verification methods are generally used to ensure that the users of the payment account cards are, in fact, authorized to use them. Known card verification methods include user signatures and personal identification numbers (PINs).

DRAWINGS

The drawings described herein are for illustrative purposes only of selected embodiments and not all possible implementations, and are not intended to limit the scope of the present disclosure.

Figure 1:
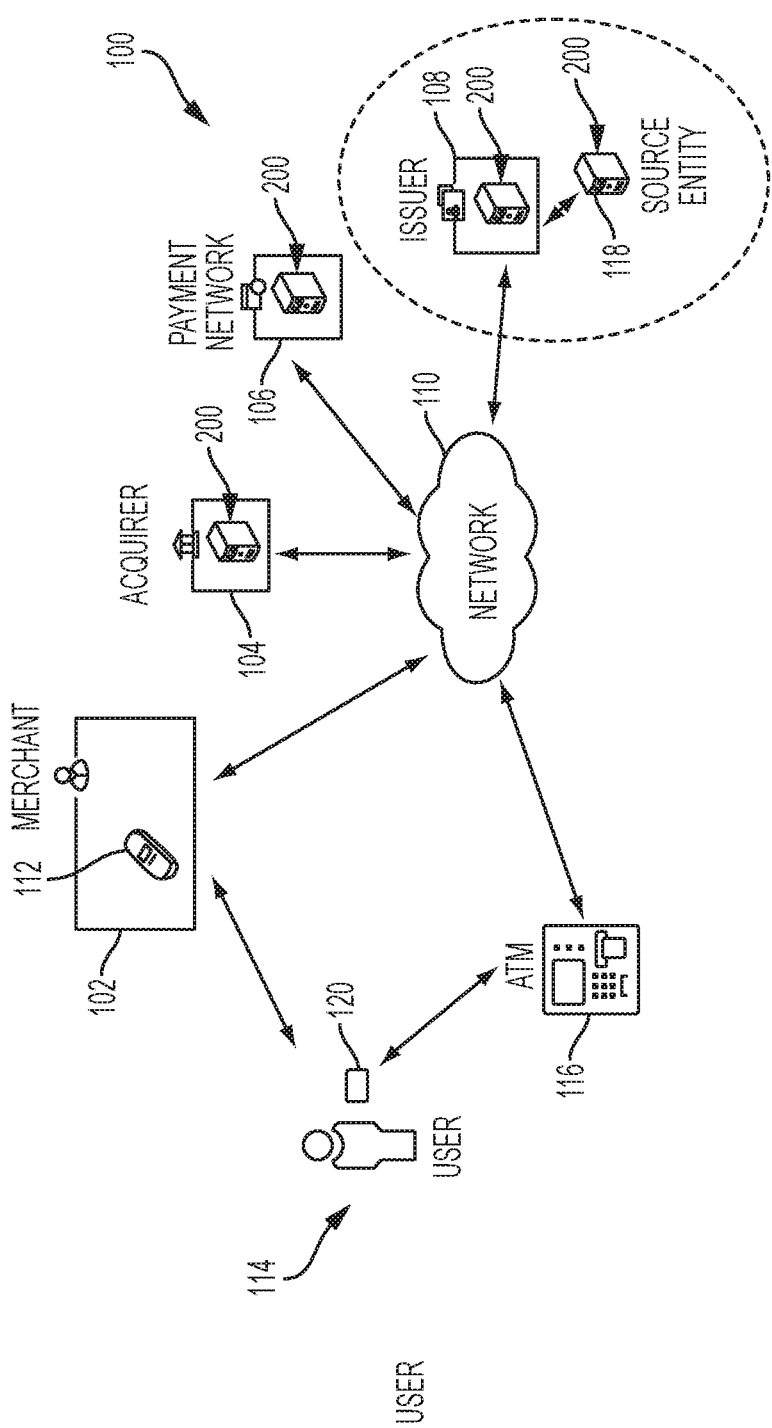
FIG. 1 is a block diagram of an exemplary system of the present disclosure suitable for use in verifying a user, via one or more biometrics, in connection with a transaction using a payment device.
Figure 5:
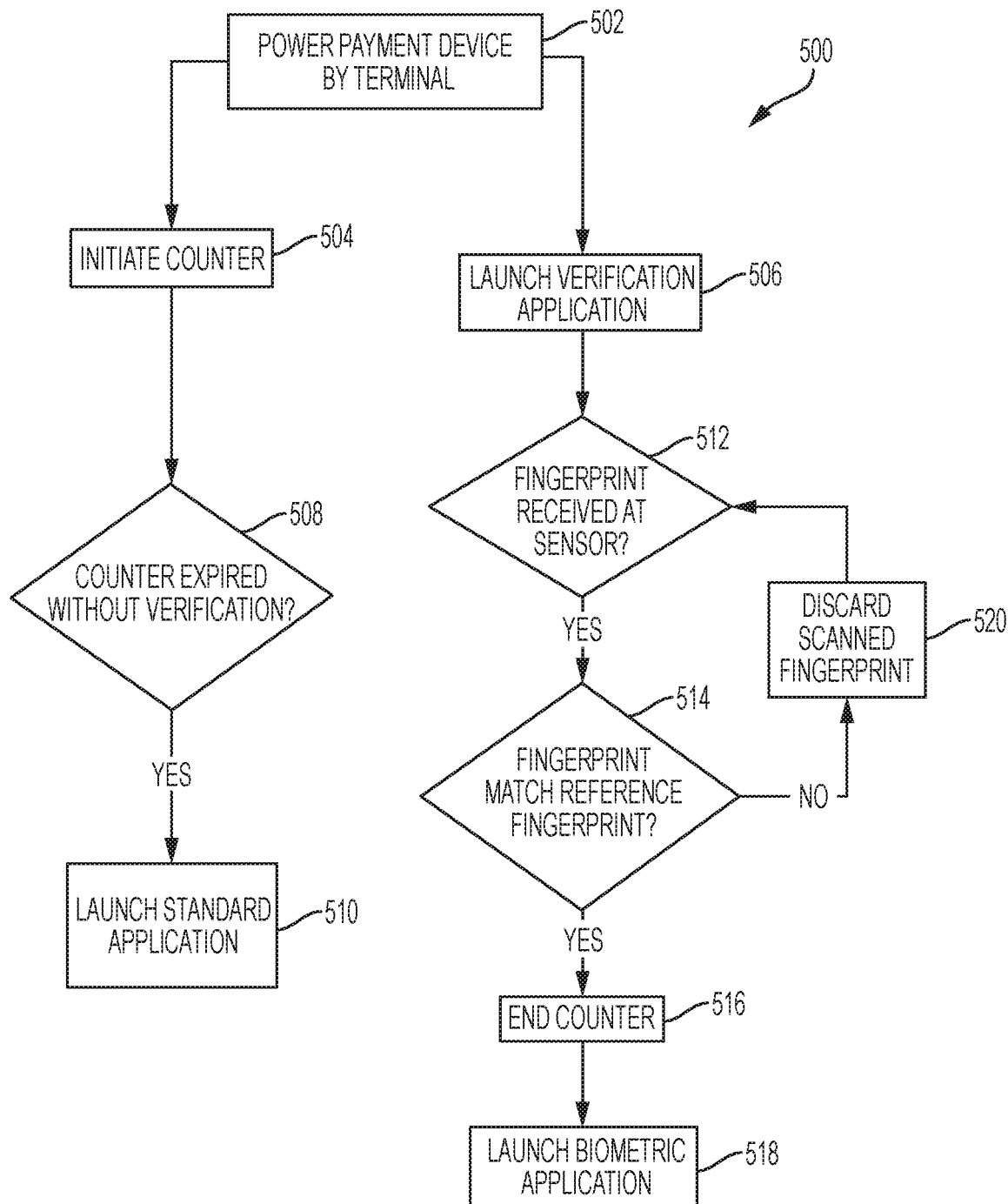
Figure 6:
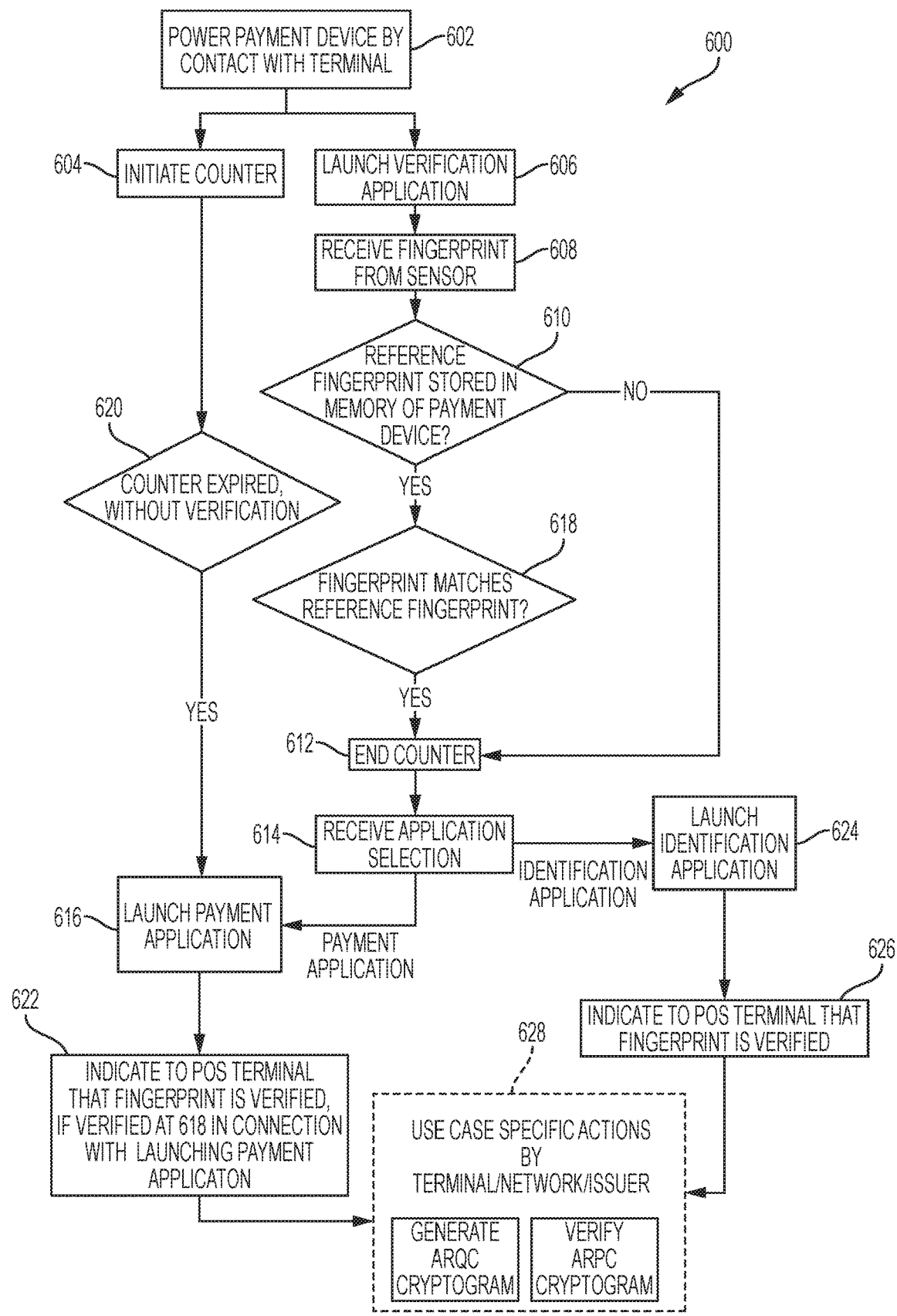

FIG. 5 is another exemplary method, suitable for use with the system of FIG. 1, for permitting verification of a user, via one or more biometrics, prior to permitting a transaction by the user involving a payment device; and FIG. 6 is still another exemplary method, suitable for use with the system of FIG. 1, for permitting verification of a user, via one or more biometrics, prior to permitting a transaction by the user involving a payment device.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Verification of users may be required, or desired, prior to distributing benefits to the users (e.g., prior to distributing products, payments, etc. to the users). The verification methods may vary for different payment accounts, depending on, for example, requirements implemented by sources of the benefits being distributed and/or certain entities controlling the payment accounts. Systems, devices and methods herein provide biometric verification of users, which is used by issuers of the payment accounts, or by others, to permit transactions, to load benefits (e.g., payments, funds, etc.) to the accounts and/or to permit withdrawal of benefits from the accounts, etc. Exemplary devices, usable as described herein, incorporate security chips (e.g., EMV chips, etc.) with biometric sensors (e.g., fingerprint sensors, etc.) into payment devices (e.g., payment cards). The security chips act to verify the users, if possible, by use of the biometric sensors and then, if verified, interact with terminals (e.g., ATMs, point of sale (POS) terminals, etc.) to provide transactions, through which the verifications are confirmed, to the issuers of the payment accounts. Due to the manner in which the security chips interact with the terminals, biometric verification to the issuers may be permitted with only minor or no modification to the conventional behavior of known terminals. The issuers, in response to the verification, may approve benefits (e.g., loading funds to the users' payment accounts, releasing goods or services to the users, etc.) based on the verifications. In this manner, the identities of the account users are verified, with significant confidence, before the benefits are "paid" (or distributed) to the users.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, depending on, for example, processes involved in verification of payment account users, types of benefit distributions to payment account users, etc.

As shown in FIG. 1, the illustrated system 100 generally includes a merchant 102, an acquirer 104 associated with the merchant 102, a payment network 106, and an issuer 108 of payment accounts, each coupled to (and in communication with) network 110. The merchant 102 includes a POS terminal 112, which permits transactions funded by payment accounts. The system 100 also includes user 114, who can interact with the merchant 102, and in particular, the POS terminal 112 to facilitate transactions between the merchant 102 and the user 114 for products and/or other benefits, from the merchant 102, including, for example, goods and services. In addition, the system 100 includes an ATM (automated teller machine) terminal 116, which is provided to perform financial transactions, such as, for example, cash withdrawals or deposits, and/or status or balance inquires, etc., by the user 114 with the issuer 108.

In this exemplary embodiment, as shown in FIG. 1, the system 100 further includes a source entity 118. As indicated by the dotted lines, the source entity 118 is associated with, or integrated with, the issuer 108. The source entity 118 is, generally, a source of benefits to be distributed to the user 114. The benefits may be any different type of goods, services, payments, cash, etc., to be funded to payment accounts associated with user 114 or distributed to the user 114 at the merchant 102, for example. The benefits may further include, for example, social benefits, such as, government assistance, or tax refunds, either of which is paid by one or more government agencies, or other entities, etc. With that said, the source entity 118 may include any source of such benefits to be distributed to the user 114 or the user's account, for which verification of the user 114 may be required, or desired, prior to distribution. Moreover, it should be appreciated that the verification provided herein for benefits distribution may be employed, within the scope of this disclosure, to transactions unrelated to benefit distribution.

While only one merchant 102 and one user 114 are illustrated in FIG. 1, it should be appreciated that any number of merchants and/or users, as described herein, may be included in different embodiments. Likewise, a different number of terminals (e.g., POS, ATM, or otherwise, etc.), acquirers, payment networks, issuers, and source entities may be included in other embodiments. Further, the merchant 102 will often include multiple POS terminals, for example. In still other embodiments, different merchants may have different acquirers, and different users may employ payment accounts issued by multiple different issuers. Further, in yet other embodiments, different source entities may be associated with different sources or manners of distribution to the user 114, or the user's payment account(s).

In the system 100, the merchant 102 and the issuer 108 are also associated, to the extent the merchant 102 is obligated and/or willing to accept identification transactions for the issuer 108 (i.e., transactions that may not include a product purchase/return). Based on the association, the POS terminal 112, or merchant 102, includes some indicia that the merchant 102 is a location willing and/or able to perform identification transactions for the user 114. At the merchant 102, therefore, the user 114 is generally able to complete two types of transactions: identification transactions (in which biometric verification is necessary), and other purchase transactions (in which biometric verification may or may not be used). An identification transaction may be just verification of the user 114, or it may additionally include the purchase of goods or services from the merchant 102.

Referring still to FIG. 1, the network 110 of the system 100 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. In addition, the network 110 may include multiple networks, where different ones of the multiple networks are accessible to different ones of the illustrated parts in FIG. 1. For example, the network 110 may include a private payment transaction network provided by the payment network 106 to the acquirer 104 and the issuer 108, and separately, a public network (e.g., the Internet, etc.) through which the merchant 102, ATM terminal 116, and/or the user 114 communicate, therebetween, or with the acquirer 104, the payment network 106, or the issuer 108.

It should be appreciated that, in the system 100, the POS terminal 112 is connected to the issuer 108, via network 110, and is thereby able to perform "online" transactions. In other embodiments, however, if a POS terminal is "offline," and/or unconnected to an issuer, verification, as described herein, may not be permitted or possible.

Each of the merchant 102, the acquirer 104, the payment network 106, the issuer 108, the POS terminal 112, the ATM terminal 116, and the source entity 118 in the system 100 is associated with, or implemented in, one or more computing devices. For illustration, the system 100 is described herein with reference to exemplary computing device 200, illustrated in FIG. 2. Each of the merchant 102, the acquirer 104, the payment network 106, the issuer 108, the POS terminal 112, the ATM terminal 116, and the source entity 118 in the system 100 is associated with, or is implemented in, such a computing device 200. However, the system 100 and its parts should not be considered limited to the computing device 200, as different computing devices and/or arrangements of computing devices may be used. In addition, different components and/or arrangements of components may be used in other computing devices. Further, in various exemplary embodiments, the computing device 200 may include multiple computing devices located in close proximity, or distributed over a geographic region, such that, for example, each computing device 200 in the system 100 may represent multiple computing devices (so long as the computing devices are specifically configured to operate as described herein).

By way of example (and without limitation), the exemplary computing device 200 may include one or more servers, personal computers, laptops, tablets, PDAs, telephones (e.g., cellular phones, smartphones, other phones, etc.), POS terminals, ATM terminals, combinations thereof, etc., as appropriate and/or as described herein.

Figure 2:
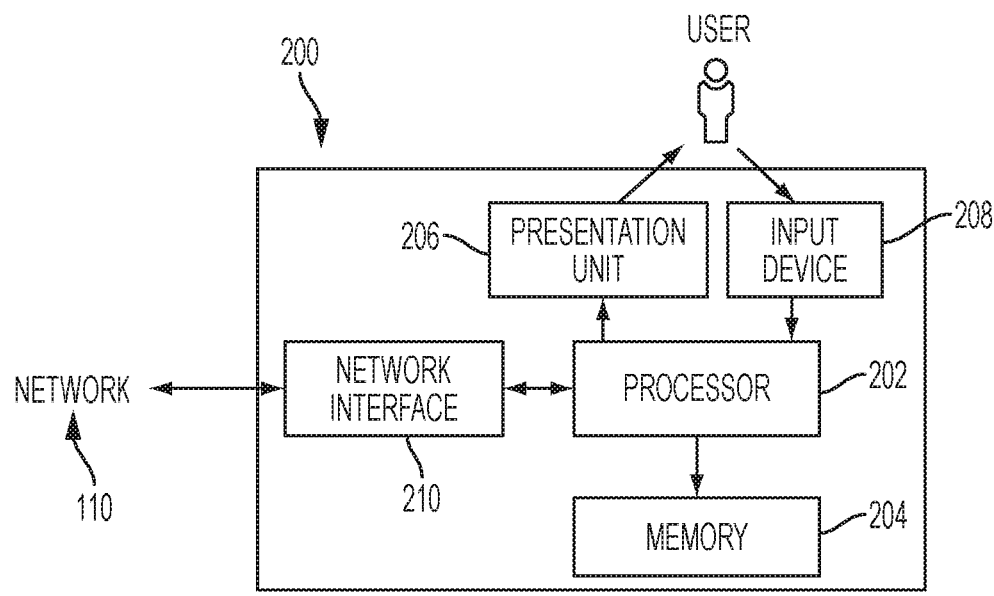
FIG. 2 is a block diagram of an exemplary computing device that may be used in the system of FIG. 1.

With reference now to FIG. 2, the computing device 200 generally includes a processor 202, and a memory 204 that is coupled to (and in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may be configured to store, without limitation, transaction data, payment account numbers (e.g., PAN, PAN+PSN, etc.), reference biometrics, cryptograms, authorization messages, authorization response messages, and/or other types of data suitable for use as described herein, etc. In addition, the memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), CD-ROMs, thumb drives, tapes, flash drives, hard disks, and/or any other type of volatile or nonvolatile physical or tangible computer-readable media. It should be appreciated that the memory 204 may include a variety of different memories.

In various embodiments, computer-executable instructions may be stored in the memory 204 for execution by the processor 202 to cause the processor 202 to perform one or more of the operations described herein, such that the memory 204 is a physical, tangible, and non-transitory computer-readable media.

The computing device 200 also includes a presentation unit 206 and an input device 208 coupled to (and in communication with) the processor 202.

The presentation unit 206 outputs information and/or data to a user (e.g., the user 114, other users, etc.) by, for example, displaying, audibilizing, and/or otherwise outputting the information and/or data. In some embodiments, the presentation unit 206 may comprise a display device such that various interfaces (e.g., application screens, webpages, etc.) may be displayed at computing device 200, and in particular at the display device, to display such information and/or data, etc. With that said, the presentation unit 206 may include, without limitation, a cathode ray tube (CRT), a liquid crystal display (LCD), a light-emitting diode (LED) display, an organic LED (OLED) display, an "electronic ink" display, speakers, combinations thereof, etc. In addition, the presentation unit 206 may include multiple devices in some embodiments.

The input device 208, when present in the computing device 200, is configured to receive input from the user 114. The input device may include, without limitation, a keyboard, a pointing device, a mouse, a stylus, a touch sensitive panel (e.g., a touch pad or a touch screen, etc.), another computing device, and/or an audio input device. Further, in some exemplary embodiments, a touch screen, such as that included in a tablet, a smartphone, or similar device, may function as both a display device and an input device.

The illustrated computing device 200 further includes a network interface 210 coupled to (and in communication with) the processor 202 and the memory 204. The network interface 210 may include, without limitation, a wired network adapter, a wireless network adapter, a mobile adapter, or other device capable of communicating to one or more different networks (e.g., the Internet, a private or public LAN, WAN, mobile network, combinations thereof, or other suitable network, etc.) that is either part of the network 110, or separate therefrom. In some exemplary embodiments, the processor 202 and one or more network interfaces may be incorporated together.

Referring again to FIG. 1, the system 100 includes a payment device 120, for use at one or multiple different terminals, including POS terminal 112 and ATM terminal 116, to perform as described herein. The payment device 120 is associated, specifically, with user 114 in the system 100 and is associated with a payment account of the user 114, issued by the issuer 108. The payment account is provided, at least in part, as a means by which the user 114 is able to receive benefits from the source entity 118. The payment account has a primary account number (or PAN), or multiple PANs, or a PAN+PSN (PAN sequence number), which is/are indicated by the payment device 120. Moreover, the PAN of the payment device 120, or one of its PANs or PAN+PSNs, is in a range of PANs recognized by the payment network 106 and/or the issuer 108 as a payment account, for which biometric verification (or biometry) applies, as described herein. In other words, in the system 100, the PAN (or PAN+PSN) is generally an indicator that the payment device 120 supports biometric verification, independent of effective use and/or result. In various embodiments, this indicator may also be used for performing selective network edits. With that said, it should still be appreciated that, in other embodiments, the PAN (or the PAN+PSN) may provide an indication that biometric verification was used successfully (with another PAN (or PAN+PSN) shown otherwise).

Figure 3:
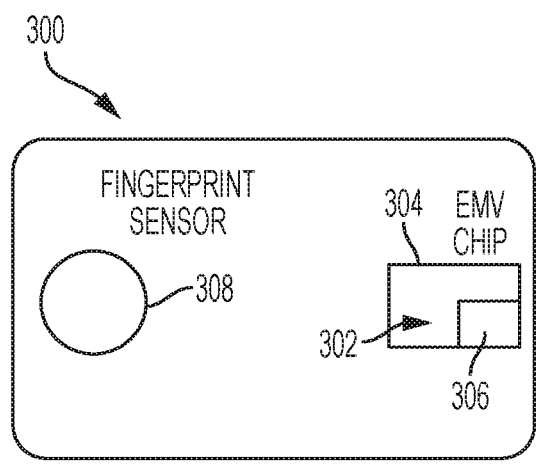
FIG. 3 is a block diagram of an exemplary payment device including a biometric sensor, which may be used in the system of FIG. 1.

For purposes of the description herein, the payment device 120, shown in FIG. 1, may be a payment device consistent with exemplary payment device 300, illustrated in FIG. 3. For example, the payment device 300 may include a credit card, a debit card, an ATM card, a pre-paid card, or other device, which includes a security chip (e.g., EMV chip, etc.). However, it should be appreciated that the systems described herein should not be understood to be limited to the payment device 300, as depicted in FIG. 3, as different payment devices may be used, and conversely, the payment devices described herein should not be limited to the system 100.

As shown in FIG. 3, the illustrated payment device 300 includes a security chip 302, which may include a contact and contactless chip and, as illustrated, incorporates a processor 304 and a memory 306. Specifically, the security chip 302 is an EMV (Europay®, MasterCard® and Visa®) chip, in the exemplary payment device 300. While a single security chip 302 is provided in payment device 300, it should be appreciated that multiple such security chips (or other security chips) may be included in other payment device embodiments. In addition, in at least one embodiment, the security chip 302 includes multiple processors, each located together in the security chip 302, or in different security chips and with each security chip handling one or more of the operations described herein.

In various embodiments, the processor 304 and memory 306 associated with the security chip 302 (or multiple security chips 302) are often formed integrally, for manufacturability and size constraints associated with the payment device 300. It should further be appreciated that the processor 304 may include one or more suitable processing units, such as described above, and the memory 306 may include any suitable devices, such as described above, each enabling the functions described herein. In this particular embodiment, the memory 306 includes both volatile memory and non-volatile memory, such that application instructions and a reference biometric are permanently stored in memory 306 (i.e., non-volatile memory), while workspace memory (e.g., memory in which intermediate calculations, for example, are stored) is lost upon loss of power to the payment device 300, or is not permanent (i.e., volatile memory).

Further, in this exemplary embodiment, the payment device 300 is subject to and complies with, in this embodiment, the ISO/IEC 7810 ID-1 standard, which generally indicates the physical dimensions and/or dimensional proportions of the payment device 300 (i.e., a payment card in this instance). Of course, however, other payment device embodiments may be constructed according to one or more different standards.

With further reference to FIG. 3, the payment device 300 includes a fingerprint sensor 308 used to verify a user (e.g., the user 114, etc.). The fingerprint sensor 308, as shown in FIG. 3, is located on an opposite side (or an opposite end portion) of the payment device 300, from the security chip 302. In this manner, the payment device 300 may be partially inserted into the POS terminal 112 or the ATM terminal 116 (or other terminal or device reader), whereby the POS terminal 112 or 116 is able to interface with and/or contact the security chip 302, while the fingerprint sensor 308 remains outside the terminal and/or accessible to the user 114. Interaction between the security chip 302 and the POS terminal 112, for example, is described in more detail hereinafter with reference to methods 400-600. Further, while the fingerprint sensor 308 is included in the payment device 300, it should be appreciated that other suitable biometric readers (included in the payment device 300, or apart from the payment device 300 in a POS terminal, for example) may be used in other embodiments (e.g., retina scanners, etc.).

With continued reference to FIG. 3, in this embodiment, the security chip 302 of the payment device 300 is configured to execute, at the least, a payment application. The payment application is identified by a root application identifier (AID) and is complemented by the verification application, which is called as a service of the payment application. The verification application, unlike the payment application, therefore, is not directly called by the POS terminal 112 or 116.

In other embodiments, the security chip 302 may be configured to select between and execute at least three different applications: a verification application, a biometric application, and a standard payment application. Here, the later applications may be identified by a root AID followed by a proprietary application identified extension, or PIX (specific to the particular application), and forming a "long" AID. In addition in these other embodiments, the payment device 300 may further include an order of execution of the applications (e.g., with the standard payment application with a higher priority than the biometric application, and with each being subject to the verification application; etc.). That is, the payment device 300 may include a priority indicator for each of the above applications, allowing a POS terminal (or other terminal) to elaborate a list with order of preference, whereby the ordinary standard payment application is selected if the biometric verification fails, while the biometric application is selected otherwise.

It should be appreciated that various different applications, as described herein, may be implemented within the security chip 302 as hardware, or firmware, or software in the form of executable instructions.

In general, according to one aspect of the present disclosure, in use of the payment device 300 in the system 100, the security chip 302 is powered from the POS terminal 112 (or ATM terminal 116), in which it is inserted. Upon power-up, the chip 302 is configured, via the processor 304, etc., to perform verification of the user 114, by capturing a fingerprint, via fingerprint sensor 308. In particular, after powering, the security chip 302 is configured to, in response to a select command from the POS terminal 112 or ATM terminal 116, launch the payment application, which calls (as a service) the verification application. The security chip 302 is configured, according to the verification application, to initiate a counter of waiting time extensions (WTX) requests, which provide sufficient time for the user 114 to provide a fingerprint to the fingerprint sensor 308. The payment device 300 thus responds to the WTX request, while the verification application is being executed (and the counter is not expired). The payment device 300, however, generally ignores other requests/commands from the POS terminal 112 or 116 (i.e., it only responds as necessary to delay one or more errors, while executing the verification application).

The security chip 302 is further configured, according to the verification application, and while the verification application is executed, to monitor the fingerprint sensor 308 to determine if the user 114 has provided a fingerprint (e.g., by swiping or touching the fingerprint sensor 308). The security chip 302 is further configured to capture a fingerprint, via the fingerprint sensor 308, when presented, to format the captured fingerprint, as needed, and to compare the captured fingerprint to a reference fingerprint stored in memory 306. Moreover, the security chip 302 is configured to store a value in the card verification result (CVR) indicative of the verification being not attempted, succeeded, or failed. The security chip 302 is further configured to return an application file location (AFL) to the POS terminal 112 or 116, whose value is based on the result of the verification (e.g., not attempted, succeeded, failed).

When the verification fails, the POS terminal 112 or 116 is configured to rely on a card verification method (CVM) list included in the AFL to determine what, if any, additional verification is necessary (e.g., online PIN, offline PIN, signature, No CVM, etc.).

Upon successful verification of the user 114, among other operations consistent with one or more EMV standards (and/or M/Chip® requirements), the security chip 302 is configured to generate an Application Cryptogram (AC) which can either be a Transaction Certificate (TC) if the transaction is approved off-line from the payment network 106 or an Authorization Request Cryptogram (ARQC) if the transaction is approved on-line to the issuer 108. The AC is generally based on standard M/Chip® Advance specifications, which define the participating chip data elements emanating from both the payment device 300 and the corresponding terminal 112 or 116. The data items to derive a secret key to generate the AC are not impacted by the biometric verification (or the biometry verification mechanism).

If the transaction is authorized on-line, then the ARQC is passed, by the payment device 300, to the POS terminal 112, for example. The POS terminal 112, in turn, generates an authorization request (including the cryptogram) and transmits it to the issuer 108, via the acquirer 104 and payment network 106. Upon receipt of the authorization request, the payment network 106 is configured to determine (for payment accounts within the specified range of PANs, for example, as described above) if the CVR bits of the authorization request indicate successful verification occurred and, if so, the payment network 106 is configured to append an indicator in one or more sub-elements and/or data elements of the authorization request (e.g., DE 48, SE 17, etc.) prior to passing the authorization request to the issuer 108. In turn, the issuer 108 is configured to determine if the verification was successful, by interpreting the indicator in the data element and/or sub-element of the authorization message (e.g., without interpreting other parts of the authorization request to determine successful verification) (and also performs conventional operations), and to provide an authorization response cryptogram (ARPC) back through the system 100 to the payment device 300, which is then verified by the security chip 302.

Further, upon power-up of the payment device 300 and security chip 302, for the first time, the memory 306 may not include reference fingerprint (broadly, biometric) data. In several embodiments, the security chip 302 is configured to store a first fingerprint, captured at fingerprint sensor 308, as processed into fingerprint data, as the reference fingerprint data. As such, the reference fingerprint (and, broadly, the reference biometric data) is specific/particular to the payment device 300 (as opposed to being stored outside the payment device 300, at a central repository, etc.). In general, the payment device 300 ignores other commands while storing the reference fingerprint data. It should be appreciated that a variety of other manners of identifying the payment device 300 to the user 114 and/or storing reference fingerprint data or other biometric, as provided by one or more enrollment procedures, may be employed, potentially, as prescribed by the issuer 108 (or source entity 118 or manufacturer of the payment device 300).

According to another aspect of the present disclosure, after powering, the security chip 302 may be configured to initiate a verification application and to initiate a counter of waiting time extensions (WTX) requests (similar to the above), which provides sufficient time for the user 114 to provide a fingerprint to the fingerprint sensor 308 (as part of the verification application). The payment device 300 is configured to then respond to the WTX request, while the verification application is being executed (and the counter is not expired), but generally ignores other commands (i.e., it only responds as necessary to delay one or more errors, while executing the verification application). If the verification fails (e.g., the fingerprint sensor 308 is not accessible to the user 114, or the fingerprint sensor 308 fails to capture a matching fingerprint, etc.), the security chip 302 may be configured to transmit the AID for the standard payment application to the POS terminal 112, for example, which is then automatically selected. The standard payment application may rely on one or more other card verification methods (CVMs), including, for example, offline PIN, online PIN, signature, no CVM, etc.

In numerous embodiments, and in connection with this aspect, upon successful verification of the user 114, the security chip 302 may be configured to proceed with launching the biometric application, whereby there is no user and/or attendant selection of application at the POS terminal 112 (or ATM terminal 116), as the selection is explicit based on the result of the verification application. In at least one embodiment, however, upon successful verification of the user 114, via the fingerprint sensor 308, the security chip 302 may be configured to set the fingerprint verified field in memory 306, and in response to the user 114, or merchant attendant, to transmit AIDs for the biometric application and/or the standard payment application to the POS terminal 112, for example, from which, the user 114 is permitted to select between a biometric payment transaction and a standard purchase transaction.

In addition, upon successful verification of the user 114, among other operations consistent with one or more EMV standards (and/or M/Chip® requirements), the security chip 302 may be configured to generate an AC which can either be a TC if the transaction is approved off-line from the payment network 106 or an ARQC if the transaction is approved on-line to the issuer 108. The AC may be based on data including the fingerprint verified field being set or not set. If the transaction is authorized on-line, then the ARQC is passed, by the payment device 300, to the POS terminal 112, for example. The POS terminal 112 in turn generates an authorization request (including the cryptogram) and transmits it to the issuer 108, via the acquirer 104 and payment network 106. In turn, the issuer 108 is configured to provide an ARPC back through the system 100 to the payment device 300, which is then verified by the security chip 302. In connection with the authentication request, it may happen that the acquirer 104 truncates a part of the authorization request related to the verified fingerprint, e.g., DE 55, etc., when the acquirer 104 (e.g., the computing device 200 associated with the acquirer 104, etc.) is not capable of carrying it through the payment network 106 to the issuer 108. To compensate, the payment network 106 and/or the issuer 108 may be configured to edit the authorization request content by adding SE 17, based on the PAN registration or the PAN and/or the PAN+PSN for the user's account, being within a range associated with identification transaction payment devices (as known to the payment network 106 and/or the issuer 108).

Also, in this aspect of the present disclosure, after verification of the user 114, regardless of the application selected (i.e., whether the user 114 is verified or not), applications in the payment device 300 may include different lists of acceptable CVMs, which, in certain embodiments, may include biometric verification, and any other CVMs generally acceptable by the issuer 108 for seeking authorization of transactions (e.g., PIN, offline PIN, online PIN, signature, no CVM, etc.). For example, the CVM list, for biometric applications, may include "signature" and "no CVM" or other, as the biometric may or may not be considered a CVM for certain terminals.

In yet another aspect of the present disclosure, the security chip 302 is again powered from the POS terminal 112 (or ATM terminal 116), in which it is inserted. Upon power-up, the chip 302 is configured, via the processor 304, etc., to perform verification of the user 114, by capturing a fingerprint, via fingerprint sensor 308, and compare the captured fingerprint to a reference fingerprint stored in memory 306, prior to expiration of a counter. In particular, after powering, the security chip 302 is configured to initiate a counter of WTX requests, which provides sufficient time for the user 114 to provide a fingerprint to the fingerprint sensor 308. In general, the payment device 300 is again configured to ignore other commands, or only responds as necessary to delay one or more errors, while executing the verification application. If the verification fails (e.g., the fingerprint sensor 308 is not accessible to the user 114, or the fingerprint sensor 308 fails to capture a fingerprint, etc.), the security chip 302 is configured to transmit the AID for the payment application to the POS terminal 112, for example, which is then automatically selected. The payment application may rely on one or more other CVMs, including, for example, offline PIN, online PIN, signature, no CVM, etc.

Upon successful verification of the user 114, via the fingerprint sensor 308, the security chip 302 may be configured to set the fingerprint verified field in memory 306, and to permit the user 114, or merchant attendant, to select an application and to transmit an AID for the selected one of the identification application and the payment application to the POS terminal 112, for example, from which, the user is permitted to select between an identification transaction and a purchase transaction.

Also in this aspect, upon power-up, the POS terminal 112, for example, may further or alternatively query the payment device 300, which is configured to respond with a listing of applications to be selected by, or through, the POS terminal 112. This generally takes place after verification of the user 114 (via the verification application) (although, it may occur at other times in other embodiments). In addition, the application in the payment device 300 may include different lists of acceptable CVMs, which, in various embodiments, includes biometric verification, and any other CVMs generally acceptable by the issuer 108 for seeking authorization of transactions (e.g., a PIN, a signature, etc.). The CMV list, for the identification application, may include, for example, "signature" and "no CVM" or other, as the fingerprint may not be considered a CVM for certain terminals.

Figure 4:
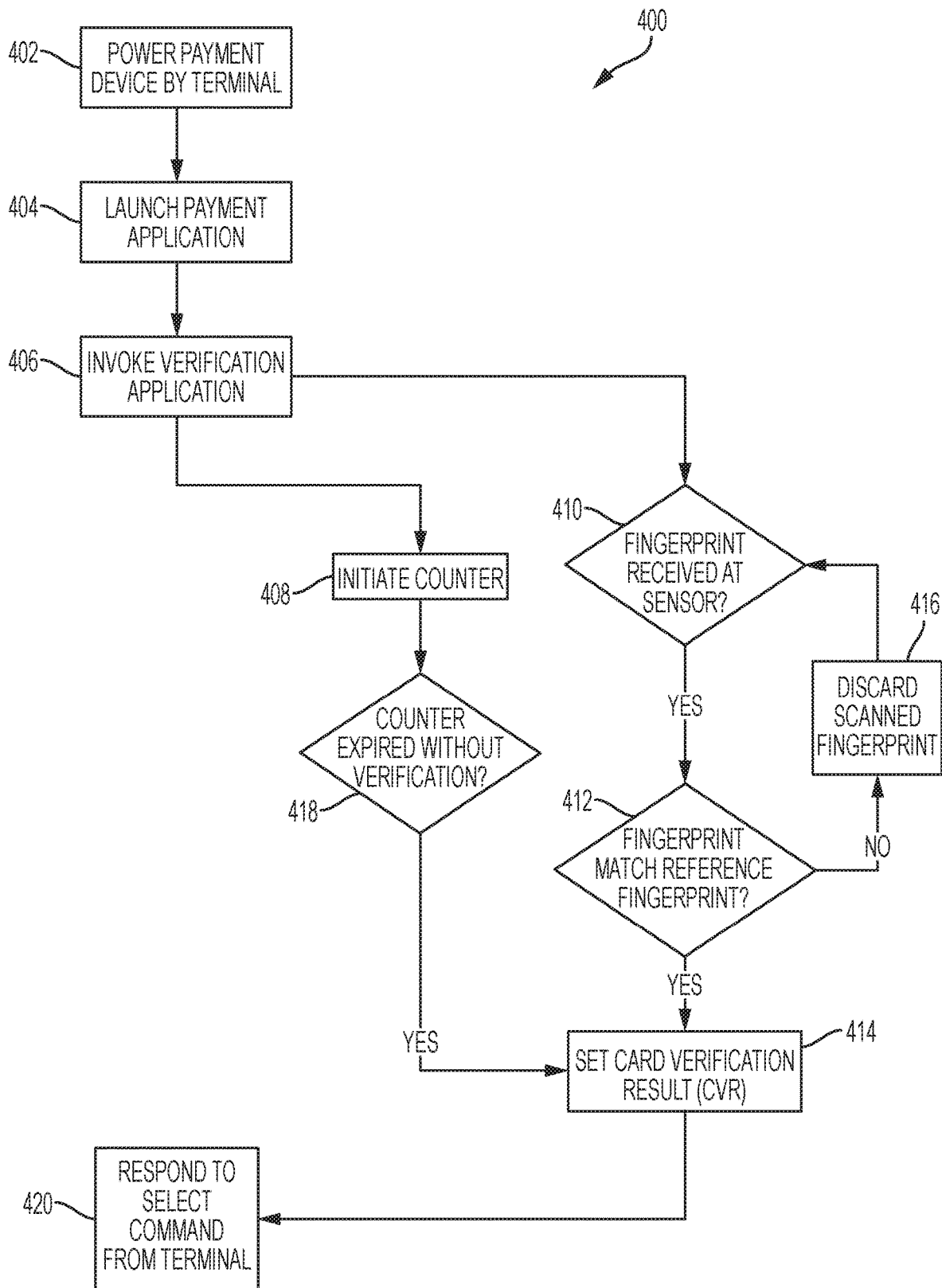
FIG. 4 is an exemplary method, suitable for use with the system of FIG. 1, for permitting verification of a user, via one or more biometrics, prior to permitting a transaction by the user involving a payment device.

FIG. 4 illustrates an exemplary method 400 of verifying a user, via a biometric, in connection with a transaction by the user, using a payment device associated with the user. The method 400 is described below in connection with the exemplary system 100, the exemplary computing device 200, and the exemplary payment device 300 previously described. However, it should be appreciated that the method 400 is not limited to the system 100, or the computing device 200, or the payment device 300, but may be implemented in a variety of different systems and/or computing devices and/or payment devices. Likewise, the systems, computing devices, and payment devices described herein should not be understood to be limited to the exemplary method 400, or other methods described herein.

As previously described, the payment device 300 is issued to the user 114 by the issuer 108, and can be used in transactions, such as to purchase products from the merchant 102 or to effect verification of the user 114 to permit distribution of one or more benefits, for example, to deposit funds to the user's payment account, to distribute cash, goods or services to the user 114 at the merchant 102, etc. (e.g., at POS terminal 112, at ATM terminal 116, etc.).

Initially, when the user 114 attempts a transaction, such as, for example, a transaction related to distribution of a benefit, at a terminal (e.g., POS terminal 112 in the following example, etc.), the user 114 inserts the payment device 300 at least partially into the POS terminal 112, or into contact with the POS terminal 112, etc. In the illustrated method 400, when the payment device 300 is placed in contact with POS terminal 112, power is provided to the payment device 300, at 402, by the POS terminal 112.

In response, the payment device 300 interacts with the POS terminal 112, whereby the POS terminal 112 issues a select command to the payment device 300 that specifies the payment application of the payment device 300 (e.g., by AID, etc.). Based on the select command, the payment device 300 launches the payment application, at 404. And, as part of the payment application, in this exemplary embodiment, the payment device 300 further invokes or otherwise executes the verification application, at 406. By including the verification application within the payment application (e.g., as a service, etc.), in this exemplary embodiment, the payment device 300 may avoid presenting different AIDs to the POS terminal 112, related to verification, which have the potential to complicate payment device/terminal interactions and/or impact payment device operation.

When the verification application is invoked (at 406), it initiates a counter, or counting feature, at 408, and begins monitoring for a fingerprint (broadly, a biometric), at 410, during a predefined time period (or during a predefined number of counts) over which the counter is active. In general, the counter operates as a timer, and is configured to implement a predefined time period (or predefined count) during which the user 114 is expected to provide a fingerprint to the fingerprint sensor 308 of the payment device 300, for use in effecting a transaction (e.g., a standard transaction, a biometric payment transaction, etc.). Specifically, the counter may include a feature in which WTX requests are counted, etc. In general, the payment device 300 counts and then responds to the WTX requests (and other requests/commands, as necessary) until the verification application is complete or the time period expires. It should be appreciated that the duration of the predefined time period, or the predefined number or count of WTX requests, may be defined, in some embodiments, depending on possible payment device performance, user convenience, one or more features of the POS terminal 112 (or other terminals), etc. In addition, the predefined time period, or predefined number of counts when used, may include any desired time or number. The predefined count may provide an interval or delay of, for example, 1 second, 2 seconds, 3 seconds, 5 seconds, 15 seconds, or other suitable intervals, etc., potentially depending on, for example, payment device performance, user convenience, terminal timeout features, etc.

In connection with monitoring for the user's fingerprint (at 410), the payment device 300 may continually, or intermittently, poll the fingerprint sensor 308 to determine if a finger is present at the fingerprint sensor 308. When a fingerprint input is detected at the fingerprint sensor 308, the payment device 300 scans the finger and then assembles the data to reformat the fingerprint image as fingerprint data, as appropriate, for example, using feature extraction, etc. With the fingerprint data, the verification application, at the security chip 302, then compares the captured fingerprint data to reference fingerprint data to determine if a match exists, at 412.

When the captured fingerprint data for the user 114 matches the reference fingerprint data (e.g., when the user's fingerprint is valid, etc.) (at 412), the payment device 300 sets one or more values of the CVR, at 414. In particular in this exemplary embodiment, the security chip 302 sets CVR [1][3] ("offline pin plaintext performed") to 1b and sets CVR [1][1] ("offline pin successful") to 1b, to indicate successful verification of the user 114. It should be appreciated that in various other embodiments, different values may be inserted into these CVR locations, or into other locations, to indicate that biometric verification succeeded. In addition, in this exemplary embodiment, the security chip 302 sets CVR [2][2] ("issuer discretionary") to 1b, to indicate that CVR [1][3] and CVR [1][1] are carrying biometric information instead of "offline pin information." However, if the captured fingerprint data for the user 114 does not match the reference fingerprint data (at 412), the payment device 300 flushes the captured fingerprint image and/or discards the received fingerprint image, at 416, as necessary and/or appropriate, and continues to determine if a fingerprint is present at the fingerprint sensor 308 (e.g., continues to attempt to capture a successful fingerprint match until the counter expires, etc.). It should be appreciated that the payment device 300 does not interfere with the biometric verification function.

With continued reference to FIG. 4, if the security chip 302 determines, at 418, via the counter, that the predefined time period expires or the count reaches the predefined number of WTX requests (i.e., the counter expiration), without input of a valid fingerprint to the payment device 300 (at 412), the payment device 300 again sets one or more values of the CVR, at 414. Here, however, when the security chip 302 has discarded one or more fingerprint scans (at 416) when attempting to identify a fingerprint match, verification of the user 114 is determined to be failed and the security chip 302 in turn sets CVR [1][3] to 1b and sets CVR [1][1] to 0b, to indicate the unsuccessful verification of the user 114 (and further sets CVR [2][2], again, to 1b). Again, it should be appreciated that in various other embodiments, different values may be inserted into these CVR locations, or other CVR locations, to indicate that biometric verification of the user 114 failed.

Alternatively, if the security chip 302 does not receive any fingerprint scans at all (at 410), when the counter expires (at 418), it is apparent that no biometric verification was attempted. This may be the case, for example, when the POS terminal 112 swallows the entire payment device 300, and the fingerprint sensor is inaccessible, and the predefined time period expires before (or without) a fingerprint being received at the fingerprint scanner 308. In response, the scrutiny chip 302 again sets one or more values of the CVR, at 414. In particular, the security chip 302 sets CVR [1][3]

to 0b and sets CVR [1][1] to 0b (and further sets CVR [2][2] to 1b), to indicate that verification of the user 114 was not attempted. Again, it should be appreciated that in various other embodiments, different values may be inserted into these CVR locations, or other CVR locations, to indicate that the biometric verification of the user was not attempted.

Then in the method 400, once the one or more values of the CVR are set (at 414), the security chip 302 responds to a select command from the POS terminal 112, at 420, by providing an AFL corresponding to the outcome (if any) of the biometric verification of the user 114. In connection therewith, a different AFL is indicated depending on the biometric verification result (e.g., depending on the CVR, etc.). For example, in connection with a successful biometric verification of the user 114, the provided AFL may include a CVM list of "noCVM" and related certificates. Alternatively, in connection with not having a successful biometric verification (regardless of reason), the provided AFL may include a CVM list of "offline PIN," online PIN," "signature," or "noCVM," and related certificates. As such, in response, the POS terminal 112 may implement one or more other verification methods (e.g., PIN, signature, etc.), as prescribed, based on the lack of biometric verification. It should be appreciated that the CVM list may be different in one or more other embodiments depending on, for example, rules and/or requirements associated with one or more merchants, acquirers, payment networks, issuers, etc., regarding verification. It should also be appreciated that the payment device 300 is configured to inhibit the verification application from being recalled by a subsequent select comment from the POS terminal 112 (e.g., as an implementation requirement by a vendor or supplier of the payment device 300, etc.).

Subsequently, the POS terminal 112 and the payment device 300 cooperate to perform a desired transaction (also see the use case examples below). In particular, and as described in connection with the system 100, the payment device 300, and specifically the security chip 302, generates a cryptogram, i.e., an AC, based on data included in the payment device 300, and specifically based on the PAN. The AC is generally based on standard M/Chip® Advance specifications, which define the participating chip data elements emanating from both the payment device 300 and the POS terminal 112. In addition, an amount of the transaction is provided, which, when zero, indicates the user 114 and/or the merchant 102 have requested a status check (or inquiry). Whether for a status check or other transaction, the POS terminal 112 generates an authorization request, including at least the cryptogram, the PAN, and the CVR, and sends the authorization request to the issuer 108, via the payment network 106 (as indicated above).

In turn, when the PAN identified in the request is within a range of PANs, etc., the payment network 106 intercepts the authorization request for the transaction. If the CVR values (or bits) included in the intercepted authorization request indicate a successful verification of the user 114, the payment network 106 may edit the authorization request content (or append thereto) by adding SE 17 in DE 48. It should be appreciated that one or more other sub-elements and/or data elements may be edited (or appended) to include an indication of verification, whether successful, failed, or not attempted, etc. Then, upon receipt of the authorization request, the issuer 108 verifies the cryptogram (based on content of the cryptogram and/or the CVR) and generates a further cryptogram, e.g., an ARPC, and sends it back through the payment network 106 to the payment device 300 at the POS terminal 112. As part of the verification, when the issuer 108 recognizes that DE 48, SE 17 is present, it interprets the authorization request as a status inquiry or other transaction, where biometric verification succeeded. Conversely, where DE 48 SE 17 is not present, the issuer 108 interprets the authorization request as a status inquiry or other transaction, where biometric verification failed or was not attempted.

In response to the ARPC, the POS terminal 112 and the payment device 300 interact to verify the cryptogram, and facilitate the transaction.

Consistent with conventional operations, purchase transactions are debited in the amount of the payment from the user's payment account in the clearing and settlement processes. For status inquiries (or identification transactions), with a $0 amount, the acquirer 104, the payment network 106, and issuer 108 recognize that no clearing and settlement is necessary. Further, in cases where a benefit is to be loaded to the payment account associated with the payment device 300, the benefit is credited or loaded to the payment account either immediately, in some embodiments, or upon clearing and settling in others. Further, when delivery of products (e.g., goods or services, etc.) from the merchant 102 is the benefit to be distributed, the merchant 102, upon completion of an identification transaction may be prompted to deliver the products to the user 114. The merchant, if attended, may further require signature for distribution of benefits. Similarly, when the terminal is the ATM terminal 116, and the benefit is a cash distribution, the ATM terminal 116 may distribute the appropriate cash amount of the user 114 upon completion of the identification transaction, as described above.

In the above cases, it should be appreciated that various different arrangements and/or operations (in the same or other sequences) may be included in how the benefits are funded and/or exchanged between the merchant 102, the issuer 108, the user 114, and the source entity 118.

The details of the above interactions between the payment device 300 and the POS terminal 112, and the other parts of the system 100, as described in the method 400, are further illustrated in the non-limiting use examples provided below.

Example 1

In this example, the user 114 presents the payment device 300 to the POS terminal 112 at the merchant 102. In response, the payment application launches and the user 114 provides a fingerprint to the fingerprint sensor 308 (in connection with the verification application invoked through the payment application). In response, the user 114 is either verified when the fingerprint matches a reference fingerprint, or is not verified when the fingerprint does not match a reference fingerprint. In connection with this example, corresponding actions associated with the user 114, the POS terminal 112, the payment network 106, and the issuer 108 are provided in Table 1.

TABLE 1

| User 114 | POS Terminal 112 | Payment Network 106 | Issuer 108 |
|---|---|---|---|
| Fingerprint captured (AFL_FP_OK is retained if fingerprint verification succeeds, otherwise AFL_FP_NOK is retained) Request for non-financial or financial transaction | Requests an online status inquiry (amount = $0, DE61/SF7 = 8) or an ordinary online/offline authorization request (amount <>0) | Possibly for specific account ranges (but not required), and if the CVR bits indicate successful fingerprint verification, the payment network adds DE48, SE17, to the authorization request | Possibly for specific account ranges (but not required), and if DE48, SE17 is present in the authorization request, the issuer interprets the status inquiry (amount = $0) as a request for social benefits or an authorization request with valid fingerprint verification. Otherwise, the issuer proceeds to an ordinary non-financial request or authorization request. |

Example 2

In this example, the user 114 presents the payment device 300 to the POS terminal at the merchant 102. In response, the payment application launches (which causes the verification application to be invoked), but the user 114 does not attempt to provide a fingerprint to the fingerprint sensor 308 (and the counter expires). In connection with this example, corresponding actions associated with the user 114, the POS terminal 112, the payment network 106, and the issuer 108 are provided in Table 2.

TABLE 2

| User 114 | POS Terminal 112 | Payment Network 106 | Issuer 108 |
|---|---|---|---|
| No fingerprint captured (AFL_FP_NOK is retained) Request for non-financial or financial transaction | Requests an online status inquiry (amount = $0, DE61/SF7 = 8) or an ordinary online/offline authorization request (amount <>0) | Possibly for specific account ranges (but not required), the payment network does not add DE48, SE17, to the request as the CVR bits do not indicate successful fingerprint verification | Possibly for specific account ranges (but not required), the issuer proceeds to an ordinary non-financial request or authorization request as DE48, SE17, is absent from the authorization request. |

FIG. 5 illustrates another exemplary method 500 of verifying a user, in connection with a transaction using a payment device associated with the user. The method 500 is described below in connection with the exemplary system 100, the exemplary computing device 200, and the exemplary payment device 300 previously described. However, it should be appreciated that the method 500 is not limited to the system 100, or the computing device 200, or the payment device 300, but may be implemented in a variety of different systems and/or computing devices and/or payment devices. Likewise, the systems, computing devices, and payment devices described herein should not be understood to be limited to the exemplary method 500, or other methods described herein.

As previously described, the payment device 300 is issued to the user 114 by the issuer 108, and can be used in transactions, such as to purchase products from the merchant 102 or to effect verification of the user 114 to permit distribution of one or more benefits, for example, to deposit funds to the user's payment account, to distribute cash, goods or services to the user 114 at the merchant 102, etc.

Initially, when the user 114 attempts a transaction, such as, for example, a transaction related to distribution of a benefit, another transaction, etc., at a terminal (e.g., POS terminal 112 in the following example, etc.), the user 114 indicates his/her intention to the merchant (if attended). The user 114 then inserts the payment device 300 at least partially into the POS terminal 112, for example. In the illustrated method 500, when the payment device 300 is placed in contact with POS terminal 112 at the merchant 102, power is provided to the payment device 300, at 502, by the POS terminal 112. In particular in method 500, the payment device 300 is powered by the POS terminal 112 when positioned in contact with, or when inserted at least partially into, the POS terminal 112.

Upon being powered at the POS terminal 112, the payment device 300 receives a "select" command from the POS terminal 112. In response, the payment device 300 initiates a counter, or counting feature, at 504, and launches a verification application, at 506.

The counter operates as a timer, and is configured to implement a predefined time period (or predefined count) to the user 114 to provide a fingerprint to the fingerprint sensor 308 of the payment device 300, when the payment device 300 is powered by the POS terminal 112, i.e., when the payment device 300 is in contact with the POS terminal 112, for use in effecting a transaction (e.g., a standard transaction, a biometric payment transaction, etc.). Or, the counter may include a feature in which WTX requests are counted, etc. In general, however, the payment device 300 responds to the WTX request (and other requests/commands, as necessary) until the verification application is complete or the time period expires. Then, if the security chip 302 determines the predefined time period expires or the count reaches the predefined number of WTX requests (i.e., the counter expiration), at 508, the payment device 300 abandons the execution of the verification application and responds to the select command from the POS terminal 112, by returning the AID of the standard payment application, thereby launching the standard application, at 510. For example, when the POS terminal 112 swallows the entire payment device 300, and the fingerprint sensor is inaccessible, the predefined time period will expire, at which time the payment device will respond with the AID for the standard payment application. It should be appreciated that the duration of the predefined time, or the predefined number or count of WTX requests, may be defined, in some embodiments, depending on possible payment device performance, user convenience, one or more features of the POS terminal 112 (or other terminals), etc. In addition, the predefined time, or predefined number of counts when used, may again include any desired time or number. The predefined count may provide an interval or delay of, for example, 1 second, 2 seconds, 3 seconds, 5 seconds, 15 seconds, or other suitable intervals, etc., potentially depending on, for example, payment device performance, user convenience, terminal timeout features, etc.

The verification application, launched by the payment device 300, at 506, is configured to monitor for a biometric, from the fingerprint sensor 308, during the predefined time period (or the predefined number of counts) over which the counter is active. In particular in the method 500, the payment device 300 continually, or intermittently, polls the fingerprint sensor 308 to determine if a finger is present at the fingerprint sensor 308, at 512. When a fingerprint input is detected at the fingerprint sensor 308, the payment device 300 scans the finger and then assembles the data to reformat the fingerprint image as fingerprint data, as appropriate, for example, using feature extraction, etc. With the fingerprint data, the verification application, at the security chip 302, compares (i.e., performs a matching check of features, for example) the captured fingerprint data to the reference fingerprint data, at 514. When the captured fingerprint data matches the reference fingerprint data (e.g., when the user's fingerprint is valid, etc.), the payment device 300 sets the fingerprint verification field and exits, or ends, the verification application and terminates the counter, at 516. It is noteworthy that the security chip 302 is not required, in this embodiment, to separately check for a reference fingerprint in memory of the payment device 300 (prior to polling for the user's fingerprint), because if no reference fingerprint is stored, no match can be made at 514, and the counter, initiated at 504, will expire at 508. In one or more other embodiments, however, the security chip 302 may determine if a reference fingerprint is stored and terminates the verification application, if none is stored.

After the fingerprint is matched, and the counter terminates, the payment device 300 launches the biometric application, at 518. In particular, when the payment device 300 receives a valid fingerprint from the user 114, at 414, via the fingerprint sensor 308, the payment device 300 receives an application selection command from the POS terminal 112 (by a merchant attendant at an attended terminal, or by the user 114 at an unattended terminal) and responds with the biometric application identifier (i.e., the long AID for the biometric application). It should be appreciated that the payment device 300 sends the long AID for the biometric application, which includes a short AID common to both the biometric application and the standard application. Specifically, in this embodiment, the AIDs include a common Registered Application Provider Identifier (RID) and Proprietary Application Identifier Extension (PIX), but different PIX extensions. The POS terminal 112 only understands the root of the AIDs (or RID+PIX), such that the payment device 300 is able to provide two different long AIDs (i.e., one for the biometric application and one for the standard payment application), and the POS terminal 112 utilizes the same process in response (despite the payment device 300 acting differently). That is, the long AID for each application includes the same root AID, which the POS terminal 112 understands to be the conventional AID for the transaction (e.g., long AID's may be A000004101001 for the biometric application and A000004101002 for the standard payment application, wherein the short AID is A0000041010; etc.). The POS terminal 112 thus launches the same POS program (or application) to coordinate the transaction, based on the root AID, regardless of the long AID, sent by the payment device 300.

Subsequently, the POS terminal 112 proceeds with the transaction and sends an authorization request for the transaction to the issuer 108 (including a PAN or PAN+PSN (broadly, account number) specific to the biometric application). The issuer 108 recognizes the fingerprint verification status by the PAN and PAN+PSN in the authorization request from the POS terminal 112, as selected by the POS terminal, as being in a range of PANs or PAN+PSNs associated with biometric verification (and thus recognizes verification of the user 114).

It should be appreciated that despite the verification, the POS terminal 112 may not recognize the verification and/or the CVM for the payment device 300, and may indicate either PIN and/or signature verification is required. As such, the user 114 will be invited to take further steps for verification at the POS terminal 112. It should further be appreciated that the user 114 may complete different transactions, via the biometric application. For example, the user may cause a $0.00 transaction (or a status inquiry transaction) (by instructing the merchant 102, for example), whereby the mere receipt of the transaction requested (with the PAN and/or PAN+PSN) causes the issuer 108 to recognize verification of the user 114, which, in turn, distributes benefits to the user (e.g., by crediting or loading the benefit to the payment account associated with the payment device 300, etc.). Additionally, or alternatively, the user 114 may cause a purchase transaction, via the biometric application, whereby the issuer 108 is likewise informed of the verification, but the user 114 is further able to initiate a transaction for products (for values other than $0.00).

Referring still to FIG. 4, if matching fails, at 514, however, the payment device 300 flushes the captured fingerprint image and/or discards the received fingerprint image, at 520, and continues to determine if a fingerprint is present at the fingerprint sensor 308 (e.g., until the counter expires, the payment device 300 is removed from the POS terminal 112, etc.).

It should be appreciated that initiating the counter, at 504, and launching the verification application, at 506, may be performed in any desired order and at any desired time. For example, the verification application may be launched, and then after, the counter may be initiated. In the illustrated method 500, however, the counter is initiated and the verification applications is launched by the payment device 300 at about the same, or substantially the same time.

As described above, conversely in the method 500, if the counter is expired, at 508, prior to, or without, achieving verification of the user 114 through the verification application, at 514, the payment device 300 launches the standard payment application, at 510. Specifically, for the standard payment application, the corresponding AID is returned, by the payment device 300, to the POS terminal 112. After which, the payment device 300 can be used in connection with a purchase transaction at the merchant 102. That said, the CVM for the payment device 300 may indicate either PIN and/or signature verification is required. Further, at this time, if the user 114 had no intention of completing a purchase transaction, but instead only intended identification of himself/herself, the user 114 may inform the merchant 102 of the same. And in response, the merchant 102 may cancel the transaction at the POS terminal 112, and the user 114 may then be invited to withdraw the payment device 300 from the POS terminal 112 and retry the transaction, as desired.

It should be appreciated that, in connection with launching the standard payment application, at 510, in the method 500, without achieving verification of the user 114 by the verification application, the resulting purchase transaction may have a different PAN (or the same PAN but a different PAN+PSN) than when the biometric application is launched after verification of the user 114 through the verification application. In this manner, the payment network 106 and/or the issuer 108 may be aware of verification by the type of transaction, i.e., a biometric payment transaction, and the PAN (or PAN+PSN) being within a particular range of PANs, etc.

Subsequently, regardless of whether the biometric application or the standard application are launched, the POS terminal 112 and the payment device 300 then cooperate to perform a desired transaction, (and as described in more detail in connection with the use case examples below). In particular, the payment device 300, and specifically the security chip 302, generates a cryptogram, i.e., an ARQC, based on data included in the payment device 300, and specifically based on the fingerprint verification field being set or not. In addition, the amount of the transaction is based on whether the merchant 102 and/or user 114 have selected a purchase transaction or a status check transaction, with the transaction amount being zero for the latter. In either case, the POS terminal 112 generates an authorization request, including the cryptogram, and sends the authorization request to the issuer 108, via the network 110 (as indicated above).

In some cases, it may happen that the acquirer 104 truncates a part of the authorization request, e.g., the DE 55, when the acquirer 104 (e.g., when the computing device 200 associated with the acquirer 104, etc.) is not capable of carrying it through the payment network 106 to the issuer 108. To compensate, the payment network 106 and/or issuer 108 may edit the authorization request content by adding SE 17 in DE 48, on the basis of the PAN registration or the PAN and a PAN+PSN for the user's account being with a particular, designated range.

In response to an (un-truncated) authorization request, the issuer 108 verifies the cryptogram and generates a further cryptogram, i.e., an ARPC, and sends it back through the payment network 106, via the network 110, to the payment device 300 at the POS terminal 112. The payment device 300 then verifies the cryptogram, and the transaction is completed. If, however, the authorization request is truncated, and the issuer 108 relied on the SE 17 in determining whether a fingerprint (or other biometric) has been verified, the issuer 108 does not return the cryptogram, because no cryptogram was received, by the issuer 108, upon which to generate the response cryptogram, i.e., the ARPC. The authorization response without the cryptogram is thus generated and returned to permit the transaction to be completed. Specifically, in this example, the issuer 108 employs ARQC validation if DE 55 (or other part including the cryptogram) is present in the authorization request.

Consistent with conventional operations, then, purchase transactions are debited in the amount of the payment from the user's payment account in the clearing and settlement processes, as described above. For identification transactions, with a $0 amount, the acquirer 104, the payment network 106, and issuer 108 recognize that no clearing and settlement is necessary. Further, in cases where a benefit is to be loaded to the payment account associated with the payment device 300, the benefit is credited or loaded to the payment account either immediately, in some embodiments, or upon clearing and settling in others. Further, when delivery of products (e.g., goods or services, etc.) from the merchant 102 is the benefit to be distributed, the merchant 102, upon completion of the identification transaction may be prompted to deliver the products to the user 114. The merchant, if attended, may further require signature for distribution of benefits. Similarly, when the terminal is the ATM terminal 116, and the benefit is a cash distribution, the ATM terminal 116 may distribute the appropriate cash amount of the user 114 upon completion of the identification transaction, as described above.

In the above cases, it should be again appreciated that various different arrangements and/or operations (in the same or other sequences) may be included in how the benefits are funded and/or exchanged between the merchant 102, the issuer 108, the user 114, and the source entity 118.

The details of the above interactions between the payment device 300 and the POS terminal 112, and the other parts of the system 100, as described in the method 500, are further illustrated in the non-limiting use examples provided below.

Example 3

The user 114 presents the payment device 300 to the POS terminal at the merchant 102. In response, the user 114 is verified, through the biometric verification application, upon which the biometric application is launched, to perform either a financial transaction such as a purchase or cash withdrawal, or a non-financial transaction, such as a status inquiry. In connection with this example, corresponding actions associated with the user 114, the POS terminal 112, the payment network 106, and the issuer 108 are provided in Table 3.

TABLE 3

| User 114 | POS Terminal 112 | Payment Network 106 | Issuer 108 |
|---|---|---|---|
| Fingerprint captured and verified (biometric application launched); | Requests an online status inquiry (amount = $0, DE61/SF7 = 8) or an ordinary authorization request | Based on account ranges (PAN/PSN), or if DE55 is present and CVR is personalized as 'fingerprint verified,' the network adds a | Based on account ranges (of PAN or PAN + PSN), or if DE55 is present and CVR is personalized as 'fingerprint verified,' |

TABLE 3-continued

| User 114 | POS Terminal 112 | Payment Network 106 | Issuer 108 |
| --- | --- | --- | --- |
| request for non-financial or financial transaction. | (amount < or > $0)). | verification indicator (e.g., SE17) to the request. | the issuer 108 interprets the status inquiry (amount = $0) as a request for social benefits. Otherwise, the issuer 108 proceeds to an ordinary non-financial request or authorization request. ARQC validation applies if DE55 is present. |

Example 4

The user 114 presents the payment device 300 to the POS terminal 112 at the merchant 102, but fails to complete verification by presenting a matching fingerprint to the payment device 300. In response, the standard payment application is launched, to perform either a financial transaction such as a purchase or cash withdrawal, or a non-financial transaction, such as a status inquiry. In connection with this example, corresponding actions associated with the user 114, the POS terminal 112, the payment network 106, and the issuer 108 are provided in Table 4.

TABLE 4

| User 114 | POS Terminal 112 | Payment Network 106 | Issuer 108 |
| --- | --- | --- | --- |
| No fingerprint captured (Standard M/Chip application is selected); request for non-financial or financial transaction. | Requests an online status inquiry (amount = $0, DE61/SF7 = 8) or an ordinary authorization request (amount < or > $0). | Based on account ranges (PAN/PSN), the network does not add a verification indicator (e.g., SE17) to the request. | Based on account ranges, the issuer 108 proceeds to an ordinary non-financial request or authorization request. ARQC validation applies if DE55 is present. |

FIG. 6 illustrates still another exemplary method 600 of verifying a user, in connection with a transaction using a payment device associated with the user. The method 600 is described below in connection with the exemplary system 100, the exemplary computing device 200, and the exemplary payment device 300 previously described. However, it should be appreciated that the method 600 is not limited to the system 100, or the computing device 200, or the payment device 300, but may be implemented in a variety of different systems and/or computing devices and/or payment devices. Likewise, the systems, computing devices, and payment devices described herein should not be understood to be limited to the exemplary method 600, or other methods described herein.

As previously described, the payment device 300 is issued to the user 114 by the issuer 108, and can be used in transactions, such as to purchase products from the merchant 102 or to effect verification of the user 114 to permit distribution of one or more benefits, for example, to deposit funds to the user's payment account, to distribute cash, goods or services to the user 114 at the merchant 102, etc.

Initially, the user 114 attempts a transaction, such as, for example, a transaction related to distribution of a benefit, another transaction, etc., at a terminal (e.g., a POS terminal 112 in the following example, etc.), the user 114 indicates his/her intention to the merchant (if attended). The user 114 then inserts the payment device 300 at least partially into the POS terminal 112, for example. In the illustrated method 600, when the payment device 300 is placed in contact with POS terminal 112 at the merchant 102, power is provided to the payment device 300, at 602, by the POS terminal 112. In particular in method 600, the payment device 300 is powered by the POS terminal 112 when positioned in contact with, or when inserted at least partially into, the POS terminal 112.

Upon being powered at the POS terminal 112, the payment device 300 initiates a counter, or counting feature, at 604, and launches a verification application at 606.

The counter may include a clock or timer configured to implement a predefined time period (or predefined count) to the user 114 to provide a fingerprint to the fingerprint sensor 308 of the payment device 300, when the payment device 300 is powered by the POS terminal 112, i.e., when the payment device 300 is in contact with the POS terminal 112, for use in effecting a transaction (e.g., a purchase transaction, an identification transaction, etc.). Or, the counter may include a feature in which WTX requests are counted, etc. If the predefined time expires or the count reaches the predefined number of WTXs, representing counter expiration, at 620, the payment device 300 abandons the execution of the verification application and responds to a select command from the POS terminal 112, by returning the AID of the payment application, at 616. It should be appreciated that the duration of the predefined time, or the predefined number count of WTXs, may be defined, in some embodiments, depending on possible payment device performance, user convenience, one or more features of the POS terminal 112 (or other terminals), including, for example, timeout for answering to a select command, at 614 (i.e., the maximum delay allowed to execute the payment application or the identification application), etc. In addition, the predefined time, or predefined number of counts when used, may include any desired time or number. For example, the predefined count may provide an interval or delay of, for example, one second, two seconds, three seconds, five seconds, 15 seconds, etc.

The verification application, launched by the payment device 300, at 606, is configured to monitor for a biometric, from the fingerprint sensor 308, during the predefined time period (or the predefined number of counts) over which the counter is active. In particular in the method 600, the payment device 300 continually, or intermittently, polls the fingerprint sensor 308, when powered, to determine if a finger is present at the fingerprint sensor 308. When a fingerprint input is detected at the fingerprint sensor 308, the payment device 300 scans the finger and then assembles the data to reformat the fingerprint image, at 608, as appropriate. With the captured fingerprint, the payment device 300 then determines, at 610, if a reference fingerprint is stored in memory 306. If no reference fingerprint is present, the payment device 300 stores the captured fingerprint in memory 306 as the reference and exits from the verification application. The payment device 300 then terminates the counter, at 612, and does not respond to (or ignores) any application selection command at 614 from the POS terminal 112 (as described more below). The POS terminal 112, generally, will then execute one or more error handling routines to manage the absence of the response, at 614, from the payment device 300 (e.g., launch the payment application at 616, simply terminate the transaction, etc.).

Alternatively, when the payment device 300 already includes the reference fingerprint in memory 306, and then receives a reference fingerprint image from the user 114 at 608, via the fingerprint sensor 308, the verification application, via the payment device 300, compares (i.e., performs a matching check) the captured fingerprint image to the reference fingerprint, at 618. When the captured fingerprint matches the reference fingerprint (e.g., when the user's fingerprint is valid, etc.), the payment device 300 sets the fingerprint verification field and exits, or ends, the verification application and terminates the counter at 612.

It should be appreciated that initiating the counter at 604 and launching the verification application at 606 may be performed in any desired order and at any desired time. In the illustrated method 600, for example, the operations are performed by the payment device 300 in parallel and at about the same.

Conversely in the method 600, if the counter is expired, at 620, prior to, or without, achieving verification of the user 114 through the verification application (at 606), the payment device 300 launches the payment application at 616 as described above. The payment device 300 can then be used in connection with a purchase transaction at the merchant 102. However, the CVM for the payment device 300 may indicate either PIN and/or signature verification is required. Further, at this time, if the user 114 had no intention of completing a purchase transaction, but instead intended identification of himself/herself, the user 114 may inform the merchant 102 of the same. And in response, the merchant 102 may cancel the transaction at the POS terminal 112, and the user 114 may then be invited to withdraw the payment device 300 from the POS terminal 112 and retry the transaction, as desired.

It should be appreciated that, in connection with launching the payment application, at 616, in the method 600, without achieving verification of the user 114 by the verification application, the resulting purchase transaction may have a different PAN (or the same PAN but a different PAN+PSN) than when the identification application is launched after verification of the user 114 through the verification application. In this manner, the payment network 106 and/or the issuer 108 may be aware of verification by the type of transaction, i.e., an identification transaction, and the PAN (or PAN+PSN) being within a particular range of PANs, etc.

With continued reference to FIG. 6, when the payment device 300 receives a valid fingerprint from the user 114, at 618, via the fingerprint sensor 308, the payment device 300 informs the POS terminal 112 of the verification. The payment device 300 then provides optional applications to the POS terminal 112, and receives an application selection command from the POS terminal 112 at 614 (by a merchant attendant at an attended terminal, or by the user 114 at an unattended terminal). In particular, upon verification of the fingerprint, the POS terminal 112 displays two applications: the identification application and the payment application. And in response, the payment device 300 proceeds with an appropriate transaction, via either the payment application or the identification application, depending on the selection at the POS terminal 112. Generally, in the illustrated embodiment, when the payment application is selected, the prior fingerprint verification of the user 114 is not apparent to the issuer 108, for example, through the authentication request. Only the identification application, when selected, is set to carry the fingerprint verification indication, in the corresponding authorization request to the issuer 108. Although, this is not required in all embodiments.

As an example, at 614, the payment device 300 may respond with the AID of the selected application, either the payment application or the identification application. When the payment application is selected, the AID returned is a longer AID than the short terminal AID in the application select command, such that the POS terminal 112 will send a second application select command (as part of operation 614), with a p2 parameter set to ask for the next occurrence. The payment device 300 then responds to the second select command by returning the AID of the payment application. The payment device 300 then waits for the final selection command with a long AID. If matching fails, however, the payment device 300 discards the received fingerprint image, and continues to poll for a fingerprint image at the fingerprint sensor 308.

When a selection of the payment application is received by the payment device 300 at 614, the payment device 300 launches the payment application at 616, as previously described. Upon recognizing that the user 114 has been verified, the payment device 300 provides an indication of the same to the POS terminal 112, at 622. The payment device 300 can then be used in connection with a purchase transaction at the merchant 102, and, as previously described, the CVM for the payment device 300 indicates that a fingerprint verification has already been performed (such that further verification is not needed).

Alternatively, when a selection of the identification application is received by the payment device 300 at 614, the payment device 300 launches the identification application, at 624. Upon recognizing that the user 114 has been verified, the payment device 300 provides an indication of the same to the POS terminal 112, at 626. And, the merchant 102 selects the status inquiry function at the POS terminal 112, for which a zero amount applies.

Subsequently, and as previously described, the POS terminal 112 and the payment device 300 then cooperate to perform a desired transaction, as generally indicated at 628 (and as described in more detail in connection with the use case examples below). In particular, the payment device 300, and specifically the security chip 302, generates a cryptogram, i.e., an ARQC, based on data included in the payment device 300, and specifically based on the fingerprint verification field being set or not. In addition, the amount of the transaction is based on whether the merchant 102 and/or user 114 have selected a purchase transaction or an identification transaction, at 614, with the transaction amount being zero for the latter. In either case, the POS terminal 112 generates an authorization request, including the cryptogram, and sends the authorization request to the issuer 108, via the network 110.

In some cases, it may happen that the acquirer 104 truncates a part of the authorization request, e.g., the DE 55, when the acquirer 104 (e.g., when the computing device 200 associated with the acquirer 104, etc.) is not capable of carrying it through the payment network 106 to the issuer 108. To compensate, the payment network 106 and/or issuer 108 may edit the authorization request content by adding SE 17, on the basis of the PAN registration or the PAN and a PAN+PSN for the user's account being with a particular, designated range.

In return, the issuer 108 verifies the cryptogram and generates a further cryptogram, i.e., an ARPC, and sends it back through the payment network 106, via the network 110, to the payment device 300 at the POS terminal 112. The payment device 300 then verifies the cryptogram, and the transaction is completed.

Consistent with conventional operations, purchase transactions are debited in the amount of the payment from the user's payment account in the clearing and settlement processes, as described above. For identification transactions, with a zero amount, the acquirer 104, the payment network 106, and issuer 108 recognize that no clearing and settlement is necessary. Further, in cases where a benefit is to be loaded to the payment account associated with the payment device 300, the benefit is credited or loaded to the payment account either immediately, in some embodiments, or upon clearing and settling in others. Further, when delivery of products (e.g., goods or services, etc.) form the merchant 102 is the benefit to be distributed, the merchant 102, upon completion of the identification transaction is prompted to deliver the products to the user 114. The merchant, if attended, may further require signature for distribution of benefits. Similarly, when the terminal is the ATM terminal 116, and the benefit is a cash distribution, the ATM terminal 116 distribution the appropriate cash amount of the user 114 upon completion of the identification transaction, as described above.

In the above cases, it should again be appreciated that various different arrangements dictate how the benefits are funded and/or exchanged between the merchant 102, the issuer 108, the user 114, and the source entity 118.

The details of the above interactions between the payment device 300 and the POS terminal 112, and the other parts of the system 100, as described in the method 600, are further illustrated in the non-limiting use examples provided below.

Example 5

The user 114 presents the payment device 300 to the POS terminal at the merchant 102. In response, the user 114 is verified, through the verification application, and then selects the identification application to receive benefits through the merchant 102. In connection with this example, corresponding actions associated with the user 114, the POS terminal 112, the payment network 106, and the issuer 108 are provided in Table 5.

TABLE 5

| User 114 | POS Terminal 112 | Payment Network 106 | Issuer 108 |
| --- | --- | --- | --- |
| Fingerprint verification + select 'identification' application (CVR is set as 'fingerprint verified'). | Requests an online status inquiry (amount = 0, DE61/SF7 = 8). | Based on account ranges, and if DE55 is present and if CVR is personalized as 'fingerprint verified', the network adds SE17 to the authorization request. | Based on account ranges, if DE55 is present and if CVR is personalized as 'fingerprint verified', the issuer interprets the status inquiry (amount = 0) as a request for benefits. ARQC validation applies. |

Example 6

The user 114 presents the payment device 300 to the POS terminal 112 at the merchant 102. In response, the user 114 is verified, through the verification application, and then selects both the payment application, to facilitate a purchase transaction at the merchant 102, and the identification application to receive benefits through the merchant 102 (the benefits may only match the purchase amount). In connection with this example, corresponding actions associated with the user 114, the POS terminal 112, the payment network 106, and the issuer 108 are provided in Table 6.

TABLE 6

| User 114 | POS Terminal 112 | Payment Network 106 | Issuer 108 |
| --- | --- | --- | --- |
| Fingerprint verification + select 'identification' application (CVR is set as 'fingerprint verified'). | Requests an online payment authorization (amount <>0, DE61/SF7<>8). | Based on account ranges, and if DE55 is present and if CVR is personalized as 'fingerprint verified', the network adds SE17 to the authorization request. | Based on account ranges, and if DE55 is present and if CVR is personalized as 'fingerprint verified', the issuer interprets the amount <>0 request as a combination of a social benefits request with a payment authorization request. ARQC validation applies. |

Example 7

The user 114 presents the payment device 300 to the POS terminal 112 at the merchant 102. In response, the user 114 is verified, through the verification application, and the user 114 then selects the payment application to facilitate a purchase transaction at the merchant 102. In connection with this example, corresponding actions associated with the user 114, the POS terminal 112, the payment network 106, and the issuer 108 are provided in Table 7. As a note, the fingerprint verification is lost in this example, as it is not considered by the issuer 108.

TABLE 7

| User 114 | POS Terminal 112 | Payment Network 106 | Issuer 108 |
| --- | --- | --- | --- |
| Fingerprint verification + | Requests an online payment | None. | Based on account ranges, the issuer |

TABLE 7-continued

| User 114 | POS Terminal 112 | Payment Network 106 | Issuer 108 |
|---|---|---|---|
| select 'payment' application (CVR is not set as 'fingerprint verified'). | authorization (amount <>0, DE61/SF7<>8). | | interprets the amount <>0 request as a payment authorization request. ARQC validation applies. |

Example 8

The user 114 presents the payment device 300 to the POS terminal 112 at the merchant 102. In response, the user 114 is verified, through the verification application, and the user 114 then selects the payment application, asking for a status inquiry to the merchant 102. In connection with this example, corresponding actions associated with the user 114, the POS terminal 112, the payment network 106, and the issuer 108 are provided in Table 8. As a note, the fingerprint verification is lost in this example, as it is not considered by the issuer 108.

TABLE 8

| User 114 | POS Terminal 112 | Payment Network 106 | Issuer 108 |
|---|---|---|---|
| Fingerprint verification + select 'payment' application (CVR is not set as 'fingerprint verified'). | Requests an online status inquiry (amount = 0, DE61/SF7 = 8). | None. | Based on account ranges, the issuer interprets the status inquiry (amount = 0) as a normal status inquiry. ARQC validation applies. |

Example 9

The user 114 presents the payment device to the POS terminal 112 at the merchant 102. In this example, the user 114 is not verified through the verification application, and the payment application is automatically selected by the payment device 300. The user 114 proceeds to make a purchase at the merchant 102. The user 114 then selects the payment application, asking for a status inquiry to the merchant 102. In connection with this example, corresponding actions associated with the user 114, the POS terminal 112, the payment network 106, and the issuer 108 are provided in Table 9. It should be appreciated that his example equally applies to the user 114 presenting the payment device 300 to an ATM.

TABLE 9

| User 114 | POS Terminal 112 | Payment Network 106 | Issuer 108 |
|---|---|---|---|
| No fingerprint verification + automatic selection of 'payment' application (CVR is not set as | Requests an online payment authorization (amount <>0, DE61/SF7<>8). | None. | Based on account ranges, the issuer interprets the amount <>0 request as a payment authorization |

TABLE 9-continued

| User 114 | POS Terminal 112 | Payment Network 106 | Issuer 108 |
|---|---|---|---|
| 'fingerprint verified'). | | | request. ARQC validation applies. |

Example 10

The user 114 presents the payment device 300 to the POS terminal 112 at the merchant 102. In this example, the user 114 is not verified through the verification application, and the payment application is automatically selected by the payment device 300. The user 114 requests a status inquiry to the merchant 102. In connection with this example, corresponding actions associated with the user 114, the POS terminal 112, the payment network 106, and the issuer 108 are provided in Table 10.

TABLE 10

| User 114 | POS Terminal 112 | Payment Network 106 | Issuer 108 |
|---|---|---|---|
| No fingerprint verification + automatic selection of 'payment' application (CVR is not set as 'fingerprint verified') | Requests an online status inquiry (amount = 0, DE61/SF7 = 8). | None. | Based on account ranges, the issuer interprets the status inquiry (amount = 0) as a normal status inquiry. ARQC validation applies. |

Example 11

The user 114 presents the payment device 300 to the POS terminal 112 at the merchant 102. In response, the user 114 is verified, through the verification application, and the user 114 then selects the payment application and requests to receive social benefits through the merchant 102. In connection with this example, corresponding actions associated with the user 114, the POS terminal 112, the payment network 106, and the issuer 108 are provided in Table 11. Generally in this example, the user 114, in good faith, simply selected the wrong application. But as the merchant 102 does not control the application selection, and as the issuer 108 cannot detect the true intention of the user 114, the issuer's response to the merchant 102 does not allow a determination as to whether or not the user 114 is entitled to receive the social benefits.

TABLE 11

| User 114 | POS Terminal 112 | Payment Network 106 | Issuer 108 |
|---|---|---|---|
| Fingerprint verification + select 'payment' application (CVR is not set as 'fingerprint verified'). | Requests an online status inquiry (amount = 0, DE61/SF7 = 8). | None. | Based on account ranges, the issuer interprets the status inquiry (amount = 0) as a normal status inquiry. ARQC validation applies. |

Example 12

The user 114 presents the payment device 300 to the POS terminal 112 at the merchant 102. In this example, the user 114 is not verified through the verification application, and the payment application is automatically selected by the payment device 300. The user 114 submits a request for a social benefit to the merchant 102. In connection with this example, corresponding actions associated with the user 114, the POS terminal 112, the payment network 106, and the issuer 108 are provided in Table 12. Generally in this example, the user 114, in good faith, simply selected the wrong application by failing to provide the valid biometric. But as the merchant 102 does not control the application selection, and as the issuer 108 cannot detect the true intention of the user 114, the issuer's response to the merchant 102 does not allow a determination as to whether or not the user 114 is entitled to receive the social benefits.

TABLE 12

| User 114 | POS Terminal 112 | Payment Network 106 | Issuer 108 |
|---|---|---|---|
| No fingerprint verification + automatic selection of 'payment' application (CVR is not set as 'fingerprint verified'). | Requests an online status inquiry (amount = 0, DE61/SF7 = 8). | None. | Based on account ranges, the issuer interprets the status inquiry (amount = 0) as a normal status inquiry. ARQC validation applies. |

It should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) receiving a select command for an application identifier (AID) associated with a payment application from a terminal; (b) in response to the select command, initiating a timer after power-up of a security chip associated with a payment device by the terminal, the payment device associated with a payment account; (c) capturing a biometric of a user, at a biometric sensor, according to the payment application, when a biometric is present at the biometric sensor; (d) verifying the captured biometric based on reference biometric data; (e) when the timer is unexpired, and the captured biometric is verified, appending a first value to a card verification result (CVR) and returning a first authentication file location (AFL) to the terminal; (f) when the timer is expired, appending a different value to the CVR and returning a different AFL to the terminal, whereby the terminal is able to proceed to an authorization request and/or employ one or more verification methods in response to the first or different AFL; (g) initiating a timer after power-up of the security chip by a terminal, the payment device associated with a payment account; (h) capturing a biometric of a user, at a biometric sensor, when a biometric is present at the biometric sensor; (i) verifying the captured biometric based on reference biometric data; (j) when the timer is unexpired, and the captured biometric is verified, launching a biometric application, whereby the terminal appends a verification indicator and/or a first account number to an authorization request for a transaction to the payment account; (k) expiring the timer when the predefined number of waiting time extension requests is satisfied; (l) when the timer is expired, launching a standard payment application, whereby the terminal omits the verification indicator from the authorization request and appends a second account number in an authorization request for a transaction to the payment account, the first account number is different than the second account number; (m) generating a cryptogram, based on the fingerprint verified field being set, when the biometric application is executed; (n) transmitting the cryptogram to the terminal, whereby the cryptogram is included in the authorization request for a biometric payment transaction; (o) comparing the captured fingering to a reference fingerprint; and (p) executing one of an identification application and a purchase application, based on a selection via a terminal in communication with the security chip.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising a payment card device, wherein the payment card device is associated with a payment account and comprises:
    a fingerprint sensor; and
    a security chip coupled to the fingerprint sensor and including a payment application and a verification application stored in the security chip;
    wherein the security chip is configured to receive a select command from a terminal when the security chip is powered by the terminal;
    wherein the security chip is further configured to invoke the payment application, in response to the select command, and wherein the security chip is configured, by the payment application, to invoke the verification application; and
    wherein the security chip is configured, by the verification application, to:
        initiate a timer;
        capture a fingerprint image, at the fingerprint sensor, when the timer is unexpired;
        validate the captured fingerprint image against reference fingerprint data in the payment card device;
        when the timer expires, without a match to the reference fingerprint data, return a first authentication file location (AFL) to the terminal; and
        when a match between the captured fingerprint image and the reference fingerprint data is found, while the timer is unexpired, return a second AFL to the terminal.

2. The system of claim 1, further comprising the terminal; wherein the terminal and the payment card device are structured such that the fingerprint sensor is accessible to a user associated with the payment card device when the security chip is in contact with the terminal; and
    wherein the terminal is selected from the group consisting of a point-of-sale (POS) terminal and an automated teller machine (ATM) terminal.

3. The system of claim 1, further comprising a payment network computing device configured to:
    intercept an authorization request associated with a transaction to the payment account, initiated by presenting the payment card device to the terminal, when an account number for the transaction is within a range of account numbers and a card verification result (CVR) included in the authorization request indicates a verified biometric;
    append a verification indicator to the intercepted authorization request; and
    pass the authorization request associated with the transaction to an issuer associated with the payment account.

4. The system of claim 3, wherein the payment network computing device is further configured to append the verification indicator to Sub-Element 17 of Data Element 48 of the intercepted authorization request.

5. The system of claim 1, wherein the security chip is further configured to:
    append a first value to a card verification result (CVR) when the match between the captured fingerprint image and the reference fingerprint data is found; and
    append a second value to the CVR when the timer expires without the match to the reference fingerprint data.

6. The system of claim 1, wherein the security chip is further configured to append a third value to the CVR when the timer expires and no fingerprint image is captured.

7. The system of claim 1, wherein one or more dimensions of the payment card device are defined by an ID-1 standard; and
    wherein the fingerprint sensor and the security chip are disposed at opposite end portions of the payment card device, such that the security chip is positioned to interact with the terminal when the payment card device is partially inserted into the terminal, while the fingerprint sensor remains accessible to a user.

8. The system of claim 1, wherein, in order to initiate the timer, the security chip is configured, by the verification application, to respond to a defined number of waiting time extension (WTX) requests received from the terminal.

9. The system of claim 8, wherein the second AFL includes a card verification method (CVM) list comprising offline personal identification number (PIN) verification, online PIN verification, and/or signature verification.

10. The system of claim 1, wherein the security chip is further configured to store the reference fingerprint data based on the captured fingerprint image, when no reference fingerprint data is stored in the payment device.

11. The system of claim 1, wherein the security chip is configured to receive the select command from the terminal when the payment card device is partially inserted into the terminal and the security chip is powered by the terminal.

* * * * *